(12) United States Patent
Yu

(10) Patent No.: US 8,543,472 B2
(45) Date of Patent: Sep. 24, 2013

(54) NETWORK DATA EXCHANGE METHOD AND NETWORK SERVER

(76) Inventor: XueXian Yu, ShenZhen (CN)

( * ) Notice: Subject to any disclaimer, the term of this patent is extended or adjusted under 35 U.S.C. 154(b) by 264 days.

(21) Appl. No.: 13/013,811

(22) Filed: Jan. 25, 2011

(65) Prior Publication Data

US 2012/0191563 A1 Jul. 26, 2012

(51) Int. Cl.
*G06Q 30/00* (2012.01)
*G06F 17/30* (2006.01)

(52) U.S. Cl.
USPC ............... 705/26.5; 705/26.1; 705/27.1

(58) Field of Classification Search
USPC ................................ 705/26.1–27.2
See application file for complete search history.

(56) References Cited

U.S. PATENT DOCUMENTS

| | | | |
|---|---|---|---|
| 7,639,943 B1 * | 12/2009 | Kalajan | 396/429 |
| 2002/0116295 A1 * | 8/2002 | Shino et al. | 705/27 |
| 2002/0156691 A1 * | 10/2002 | Hughes et al. | 705/26 |
| 2007/0188488 A1 * | 8/2007 | Choi | 345/419 |
| 2008/0147512 A1 * | 6/2008 | Yankton | 705/26 |
| 2008/0163328 A1 * | 7/2008 | Philbin et al. | 725/139 |
| 2010/0073768 A1 * | 3/2010 | Kim et al. | 359/463 |
| 2011/0213480 A1 * | 9/2011 | Zila et al. | 700/98 |
| 2011/0231428 A1 * | 9/2011 | Kuramura | 707/769 |
| 2012/0127319 A1 * | 5/2012 | Rao et al. | 348/169 |

FOREIGN PATENT DOCUMENTS

| | | |
|---|---|---|
| CN | 1464335 A | 12/2003 |
| CN | 1620111 A | 5/2005 |
| CN | 101005595 A | 7/2007 |
| CN | 101136094 A | 3/2008 |
| CN | 101639921 A | 2/2010 |

OTHER PUBLICATIONS

"Intelligent Camera Control in a Virtual Environment." Steven M. Drucker and David Zeltzer. Graphics Interface. microsoft.com. 1994. [recovered from Google Scholar on May 13, 2013].*

* cited by examiner

*Primary Examiner* — Matthew Zimmerman
*Assistant Examiner* — Kathleen G Palavecino
(74) *Attorney, Agent, or Firm* — Cheng-Ju Chiang

(57) ABSTRACT

An exemplary network data exchange method includes the steps of: receiving a commodity browsing request containing a requester network address from a network; finding out a camera corresponding to the commodity browsing request; obtaining a control right or an access right of the camera; using the camera to capture the commodity according to a received camera operating request and obtaining videos or images of the commodity; and sending the videos or the images to the requester network address by the network. A network server is also provided in the present disclosure. The present disclosure may effectively improve the operation efficiency of an online shopping system as well as the efficiency and the accuracy of online shopping by utilizing the online shopping system by users, and promotes the consumption.

14 Claims, 6 Drawing Sheets

NETWORK DATA EXCHANGE METHOD AND NETWORK SERVER

TECHNICAL FIELD

The present disclosure generally relates to a network data exchange method and network server.

BACKGROUND

A usual way for a consumer is to go to a store, with or without a shopping list, locate the required items on the store's shelves, purchase them and then take the items home, or to work.

A drawback for the usual way is the large amount of inventory which must be made available. Today, customers lead very busy lives and often do not have the time to sift through all of the commodity. Thus, a need exists for a method of allowing customers to see commodity quickly and efficiently.

Therefore, online shopping is getting more and more popular. A consumer browses an online catalog, purchases the selected item with a credit card and the commodity is delivered to the consumer. Various retailers have adopted this business model, e.g. digital products can be ordered online and delivered to a consumer.

However, typical online shopping is lack of on-the-spot sense, and the consumer may not select and observe the commodity at pleasure. Sometimes, a bought commodity may be different from what a consumer really wants. Therefore, the above-described drawbacks may result in negative effects to online shopping.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF EMBODIMENTS

Reference will now be made to the drawings to describe preferred and exemplary embodiments of the present disclosure in detail.

Figure 1:
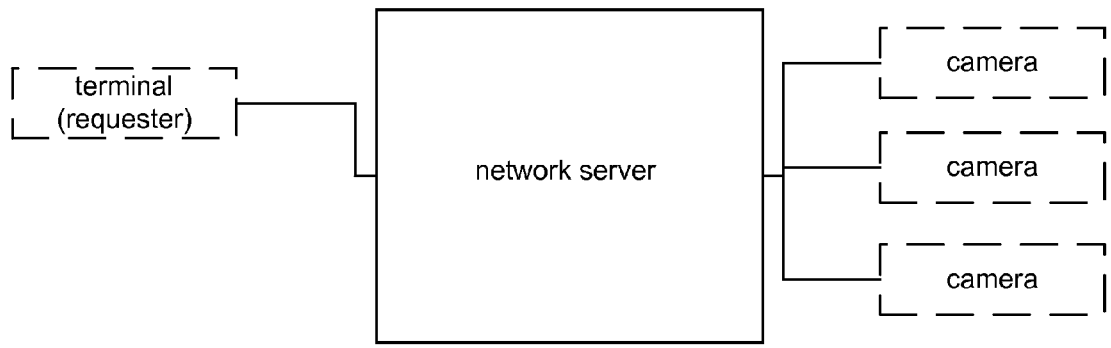
FIG. 1 shows a schematic diagram for illustrating a shopping system applying a network data exchange method of the present disclosure.
Figure 2:
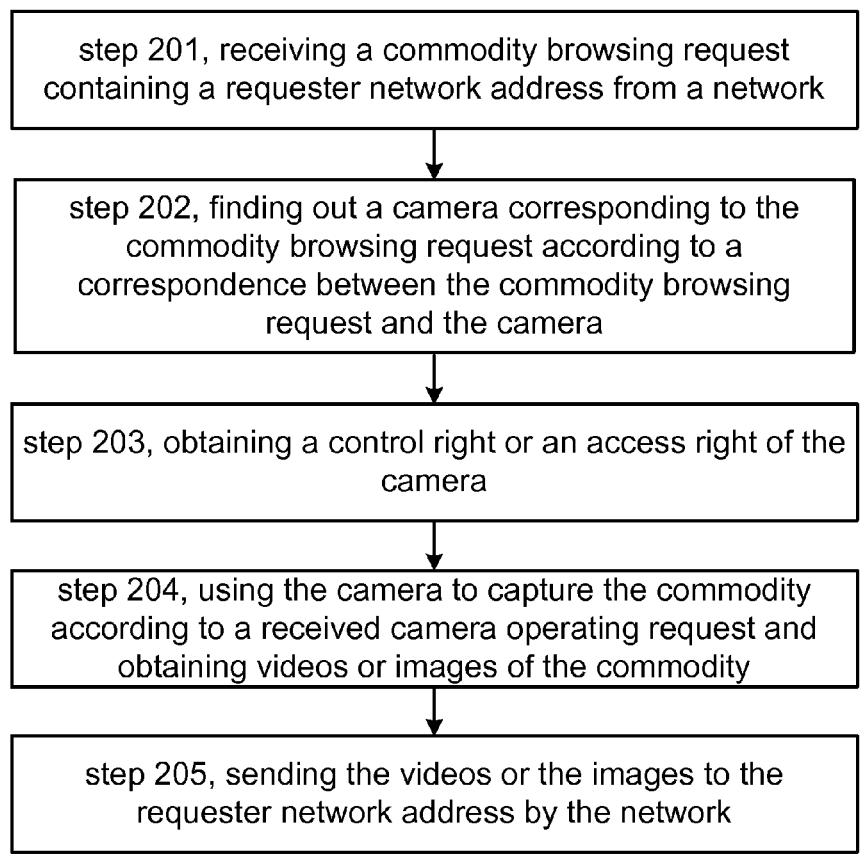
FIG. 2 shows a schematic diagram for illustrating the network data exchange method of the present disclosure.

Referring to FIG. 1 and FIG. 2, a network data exchange method of the present disclosure includes the steps of:

step 201, receiving a commodity browsing request containing a requester network address from a network;

step 202, finding out a camera corresponding to the commodity browsing request according to a correspondence between the commodity browsing request and the camera;

step 203, obtaining a control right or an access right of the camera;

step 204, using the camera to capture the commodity according to a received camera operating request, and obtaining videos or images of the commodity; and step 205, sending the videos or the images to the requester network address by the network.

In the present disclosure, a requester, for example a consumer, may use a PC (personal computer), a mobile phone functioned with Wi-Fi (wireless fidelity), a PDA (personal digital assistant) or any devices that can browser a website built according to the present disclosure, to browse webpages of the website, send a commodity browsing request, and view the commodity by a camera. Compared with a usual way of in-store shopping, the present disclosure may effectively improve the operation efficiency of an online shopping system as well as the efficiency and the accuracy of online shopping by utilizing the online shopping system by users, and promotes the consumption.

Figure 3:
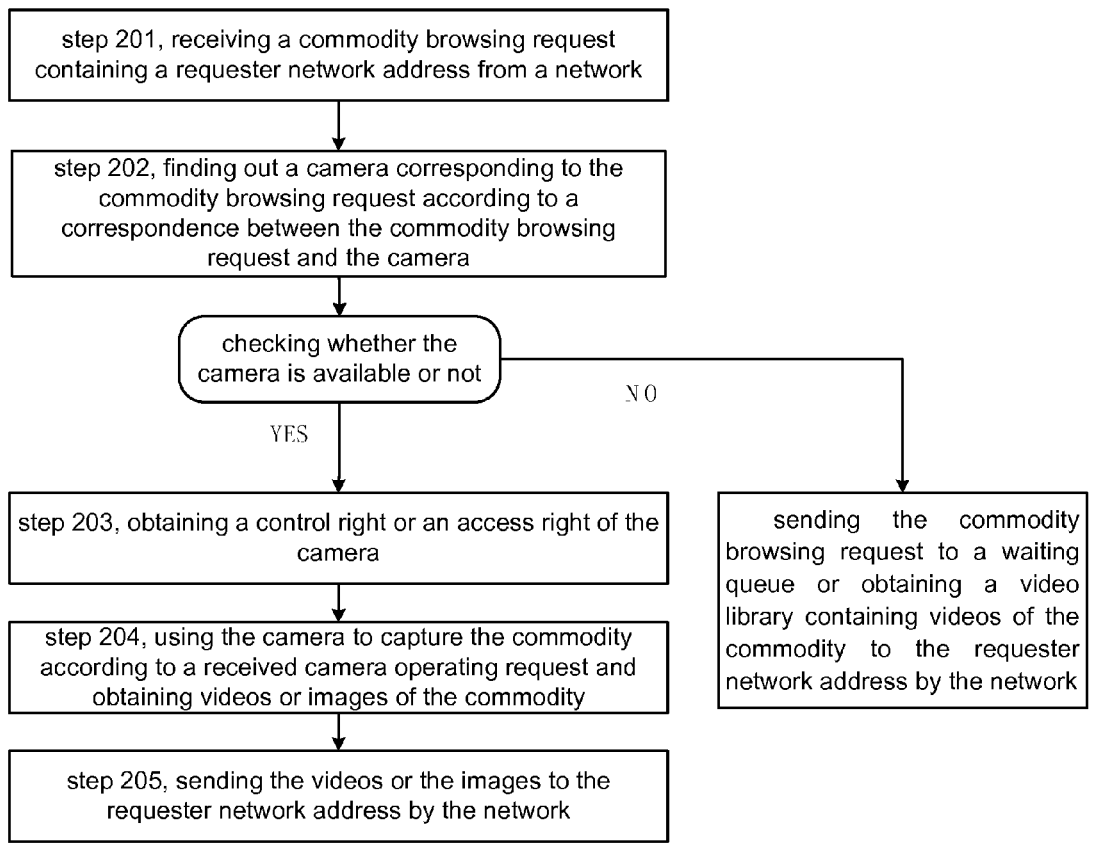
FIG. 3 shows a schematic diagram for alternatively illustrating the network data exchange method of the present disclosure.

Alternatively, referring to FIG. 3, the following procedures may be further included before the step 203:

1) checking whether the camera is available or not;

2) obtaining the control right or the access right of the camera if a check result is YES;

3) sending the commodity browsing request to a waiting queue or obtaining a video library containing videos of the commodity to the requester network address by the network if a check result is NO.

Therefore, cached or saved videos of the commodity in the video library are directly provided to the requester when multi consumers request the control right or the access right of the camera at the same time.

Alternatively, the step 204 may include the following procedures:

1) listing videos sorted by commodity name, view angle, view distance, view light beams or view mode from the video library on a webpage according to the commodity browsing request; and 2) choosing the videos filtered by commodity name, view angle, view distance, view light beams or view mode from the video library according to the commodity browsing request.

The sort options may be most frequently needed options for the requester, and this provides different options for the consumer to get desired videos with optimized resources.

Alternatively, the following procedure may be further included after the step 205: finding out the camera corresponding to the commodity browsing request according to the correspondence between the commodity browsing request and the camera when the commodity browsing request contains demands of changing view angle, photo-sensibility, ambient light, zooming in, zooming out, or camera switching.

Therefore, this provides two more options for browsing the commodity. The first option is that a video including rough views of the commodity is played for the consumer or is directly sent to consumer. The second option is that the control right of the camera is entitled to the consumer if more details of the commodity are further needed. Thus, a service efficiency of the camera is optimized.

In the present disclosure, the camera may be a real camera or a virtual camera. The virtual camera may be realized by using a video library or building a 3D image system of the commodity. For example, a video existed in the video library containing zoomed in details of the commodity is played when the consumer wants a zooming in view of the commodity. Also, the consumer may use the 3D image system to obtain details similar to those obtained from a real camera.

Alternatively, the following procedures may be further included in the procedure of sending the commodity browsing request to a waiting queue:

1) judging a priority level of the commodity browsing request; and 2) sending the browsing request to a position corresponding to the priority level of the waiting queue.

Therefore, the consumer having a high priority level may obtain control right of the camera first. Also, the camera may be associated with requester information which may include requester name or requester account.

Alternatively, the following procedure may be further included in the step of sending the videos to the requester network address by the network:

1) checking whether a 3D browsing demand is included in the commodity browsing request; and 2) if a checking result is positive, sending a 3D video or picture of the commodity to the requester network address;

3) if a checking result is negative, sending a 2D video or picture of the commodity to the requester network address.

Therefore, the consumer may watch the 3D video to view 3D scenes of the commodity with 3D glasses, which further improves a on-the spot sense.

Alternatively, the following procedure may be further included in the step of sending the videos or the images to the requester network address by the network:

1) real-time sending the images or the videos to the requester network address by the network; or 2) delay time sending the images or the videos to the requester network address by the network.

Therefore, the images or the videos may be sent to the requester network address according to a network state or an option made by the consumer.

Alternatively, the following procedures may be further included in the step 202:

finding out the camera assigned to the requester according to request information of the commodity browsing request; or finding out the camera corresponding to the commodity browsing request according to the correspondence between the commodity browsing request and the camera from local, remote market or network camera database. Therefore, different kinds of cameras may be integrated and provided to a network server for multiple shops, which may provide the consumer great choices to shop in the whole city, the whole state, and even the whole world.

Alternatively, a camera automatically taking images of the commodity may be judged as an available camera in the procedure of checking the availability of the camera.

Alternatively, the control right or the access right of the camera may be individually obtained, or shared with another or other requester(s).

Alternatively, more commodity browsing options are provided. For example, the camera may take images around the commodity, from top to bottom, from zooming out to zooming in or along other suitable tracks according to the different commodity browsing demands. Furthermore, the images or the videos may be recorded and further downloaded to a local computer. Alternatively, the cameras may be divided into a plurality of groups, one group of cameras take images under predetermined rules, and other groups the cameras may be fully accessed to take images according to specific commodity browsing requests from the consumer regardless of the predetermined rules. Therefore, videos taken under predetermined rules may be provided to the consumer with less resource occupation.

The camera may be moveable which means a position and an angle of the camera may be changed, or be static which means a position, a view distance and a view angle of the commodity may vary. For example, the commodity may be held by a machine arm, and may be rotated, fluctuated or change its position, thereby the images taken by different demands may be provided.

Figure 4:
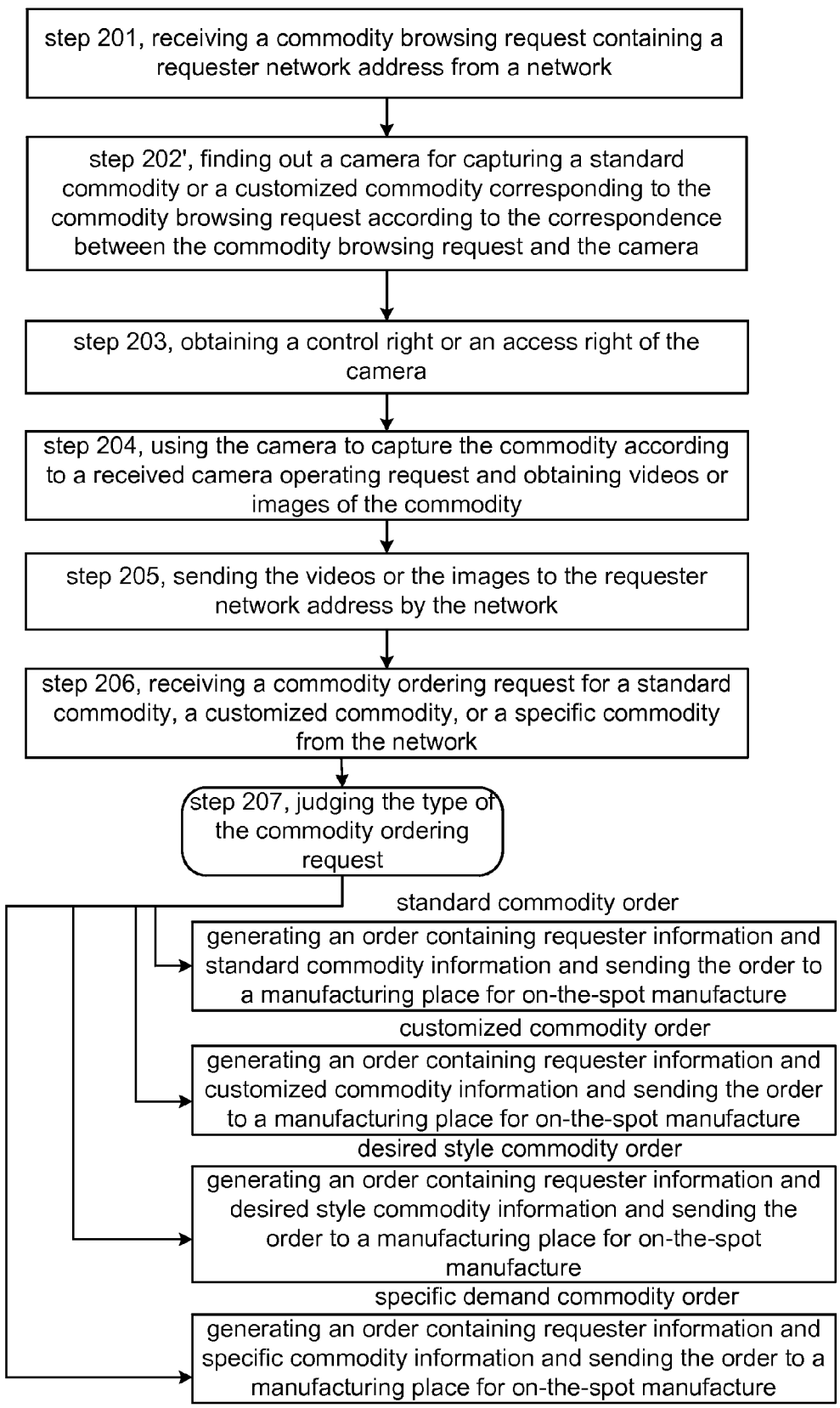
FIG. 4 shows a schematic diagram for alternatively illustrating the network data exchange method of the present disclosure.

Alternatively, referring to FIG. 4, the following procedure may be further included in the step 202:

step 202', finding out a camera for capturing a standard commodity or a customized commodity corresponding to the commodity browsing request according to the correspondence between the commodity browsing request and the camera;

Alternatively, the following steps may be further arranged after the step 205:

step 206, receiving a commodity ordering request for a standard commodity, a customized commodity, or a specific commodity from the network;

step 207, judging the type of the commodity ordering request, and:

if the commodity ordering request is for a standard commodity, generating an order containing requester information and standard commodity information and sending the order to a manufacturing place for on-the-spot manufacture;

if the commodity ordering request is for a customized commodity, generating an order containing requester information and customized commodity information and sending the order to a manufacturing place for on-the-spot manufacture;

if the commodity order request is for a desired style commodity, generating an order containing requester information and desired style commodity information and sending the order to a manufacturing place for on-the-spot manufacture;

if the commodity order request is for a specific commodity, generating an order containing requester information and specific commodity information and sending the order to a manufacturing place for on-the-spot manufacture.

Therefore, customized online shopping is provided. The on-the-spot manufacturing may speed up the commodity manufacture. Different modes including best cost performance mode, best performance mode, best cost mode or gift mode may be provided to the consumer.

Alternatively, the procedure of sending the order containing requester information and commodity information to the manufacturing place for on-the-spot manufacture may include:

sending information of components, size, shape, and price of a greeting card, and images, audios, texts or videos from the requester to a network server to generating the order; and sending the order to the manufacturing place for on-the-spot manufacture.

Alternatively, the following procedure may be further included after the procedure of sending the order to the manufacturing place for on-the-sport manufacture:

1) sending a commodity complete notification to the requester via email, SMS (short message service) or instant message service, and 2) delivering the commodity to a delivery address contained in the commodity order.

The illustrated embodiment applies to online shopping for a real card, specifically for the real card containing audios, videos, images or texts from the requester.

For further improving a use value of the real gift card, the audios from the requester may be replaced with other desired audios such as audios of a movie star. Similarly, clothes of persons of the images may be replaced with fashion clothes, classic clothes or specific clothes from a movie star.

The gift card is just an example of the present disclosure, and the commodity can be other kinds of products, such as a computer, a camera, a digital player, a book, a digital media, or even an education service and trainings.

Alternatively, the procedure of sending the commodity complete notification to the requester may include: sending the commodity complete notification containing a commodity preview network link to the requester via email, SMS or instant message service.

Alternatively, the following procedures may be further included after the procedure of sending the commodity complete notification to the requester:

1) receiving a commodity preview request from the requester by the network;

2) sending commodity videos taken by the camera to the requester by the network; and 3) delivering the commodity to the delivery address of the requester after acceptance check received from the requester by the network.

The consumer may preview and check the commodity before the delivery of the commodity.

Figure 5:
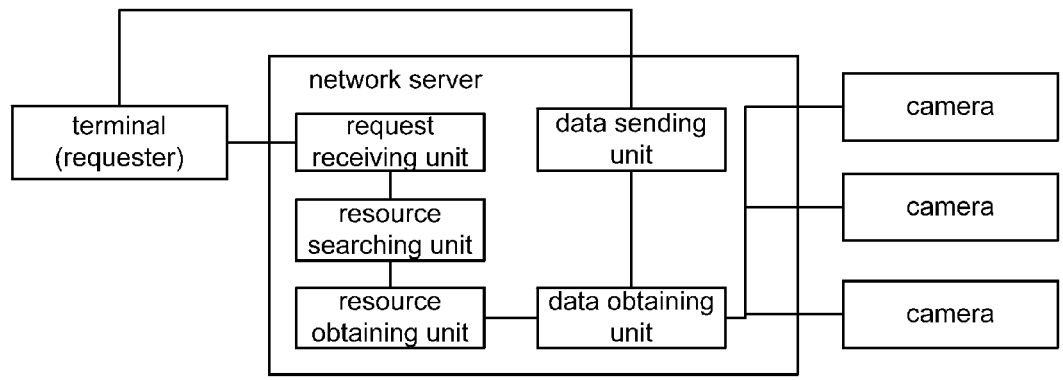
FIG. 5 shows a schematic diagram for illustrating a network server of the present disclosure.

Referring to FIG. 5, the present disclosure further provides a network server. The network server includes:

a request receiving unit configured for receiving commodity browsing request containing a requester network address;

a resource searching unit configured for finding out a camera corresponding to the commodity browsing request according to the correspondence between the commodity browsing request and the camera after the request receiving unit receives the commodity browsing request;

a resource obtaining unit configured for obtaining a control right or an access right of the camera after the camera is found out by the resource searching unit;

a data obtaining unit configured for capturing the commodity according to a camera operating request after the control right or the access right is obtained by the resource obtaining unit; and a data sending unit configured for sending the images or the videos to the requester network address after the images or the views are taken by the data obtaining unit.

The network may be used for online shopping employing the network data exchange method of the present disclosure.

Figure 6:
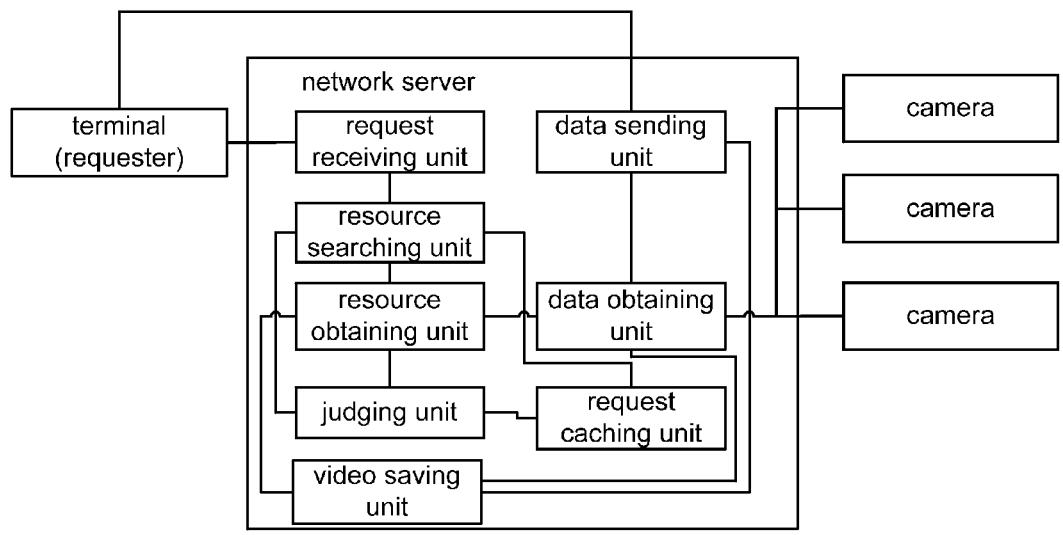
FIG. 6 shows a schematic diagram for alternatively illustrating the network server of the present disclosure.

Referring to FIG. 6, the network server may further include:

1) a judging unit configured for checking the availability of the camera and triggering the resource obtaining unit if the camera is available;

2) a request caching unit configured for caching the commodity browsing request and sending the commodity browsing request to the waiting queue if there is no available camera; and 3) a video saving unit configured for saving videos of the commodity to the video library.

The resource obtaining unit may obtain the saved videos from the video library if there is no available camera and sending the saved videos from the video library to the requester network address.

Figure 7:
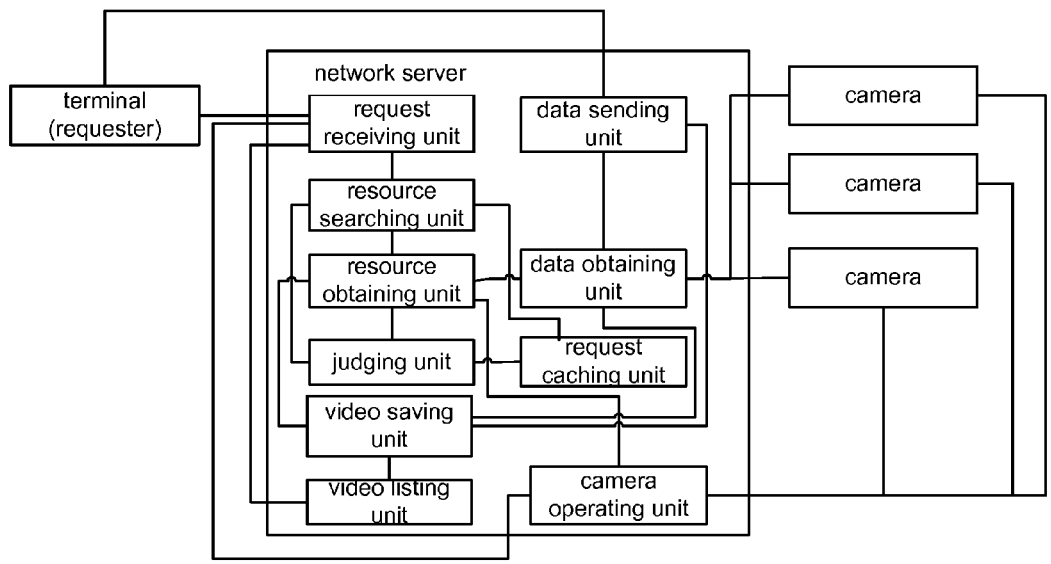
FIG. 7 shows a schematic diagram for alternatively illustrating the network server of the present disclosure.

Alternatively, referring to FIG. 7, the videos saving unit may save the videos of the commodity according to commodity name, view angle, view distance, light beams or view mode.

Alternatively, the network server may further include a video listing unit. The video listing unit is configured for choosing the videos according to commodity name, view angle, view distance, light beams or view mode of from the video saving unit according to the commodity browsing request, and listing the videos on the webpage with a tree structure.

Alternatively, the network server may further include a camera operating unit configured for operating the camera according to the commodity browsing request containing demands of changing view angle, photo-sensibility, zooming out, zooming in, or switching camera.

Alternatively, the camera may be a 3D video camera capable of taking 3D videos.

Alternatively, the camera operating unit is further configured for automatically capturing the commodity under predetermined rules.

Alternatively, the network server may further include a resource sharing unit. The resource sharing unit is configured for sending a camera sharing instruction to the data sending unit and instructing the data sending unit to send the videos or the images to more than one requesters.

Alternatively, the network server may further include a commodity listing unit and a commodity complete notifying unit.

The commodity listing unit is configured for listing complete commodity or commodity component, and according to the commodity order request received by the request receiving unit;

if the commodity ordering request is for a standard commodity, generating an order containing requester information and standard commodity information and sending the order to a manufacturing place;

if the commodity ordering request is for a customized commodity, generating an order containing requester information and customized commodity information and sending the order to a manufacturing place for on-the-spot manufacture;

if the commodity order request is for a desired style commodity, generating an order containing requester information and desired style commodity information and sending the order to a manufacturing place for on-the-spot manufacture;

if the commodity order request is for a specific commodity, generating an order containing requester information and specific commodity information and sending the order to a manufacturing place.

The commodity complete notification unit is configured for sending a commodity complete notification to the requester via email, SMS or instant message service when the commodity manufacture is complete.

Figure 8:
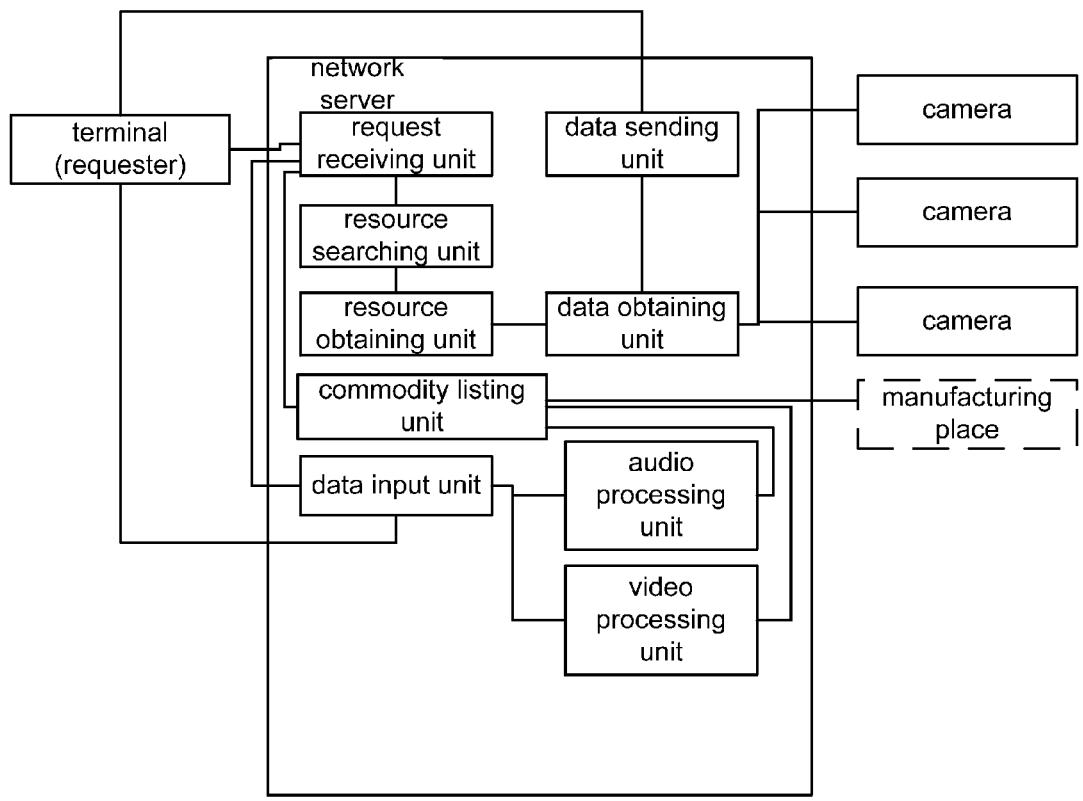
FIG. 8 shows a schematic diagram for alternatively illustrating the network server of the present disclosure.

Referring to FIG. 8, the network server may further include:

a data input unit configured for inputting audios or videos from the requester if the commodity ordering request is for a customized commodity;

an audio processing unit configured for converting the audios from the requester into audios from a movie star and sending to the commodity listing unit to generate the commodity order; and a video processing unit configured for converting a shape or clothes of a person of the video from the requester into those of a movie star and sending to the commodity listing unit to generate the commodity order.

According to the common knowledge, a network server is a device which generally includes memory, storage, CPU and network card. And a network server receiving or sending data with network card; keeping useful data in memory or storage;

CPU catching the data from memory or indirectly catching the data from storage and processing the data. Network card includes a request receiving unit, a data sending unit, a resource sharing unit, and a commodity complete notifying unit; CPU generally includes a resource searching unit, a resource obtaining unit, a data obtaining unit, a judging unit, camera operating unit, a commodity listing unit; and a request caching unit; and the video saving unit is a storage.

Network card receives commodity browsing request containing a requester network address; CPU finds out a camera corresponding to the commodity browsing request; obtains a control right or an access right of the camera; and capture the commodity according to a camera operating request; network card send the images or the videos to the requester network address after the images or the views are taken by the CPU.

Further, CPU checks whether the camera is available or not, obtains a control right or an access right of the camera if a check result is YES; catches the commodity browsing request and sends the commodity browsing request to the waiting queue of memory if there is no available camera, or obtains the saved videos from the video library which in the storage if there is no available camera and sends the saved videos to the requester network address by network card;

Further, CPU operates the camera according to the commodity browsing request containing demands of changing view angle, photo-sensibility, zooming out, zooming in, or switching camera.

Further, CPU sends a camera sharing instruction to the network card and instructs the network card to send the videos or the images to more than one requesters.

Further, CPU lists complete commodity or commodity component, and according to the commodity order request received by the network card.

Further, network card sends a commodity complete notification to the requester via email, SMS or instant message service when the commodity manufacture is complete.

Figure 9:
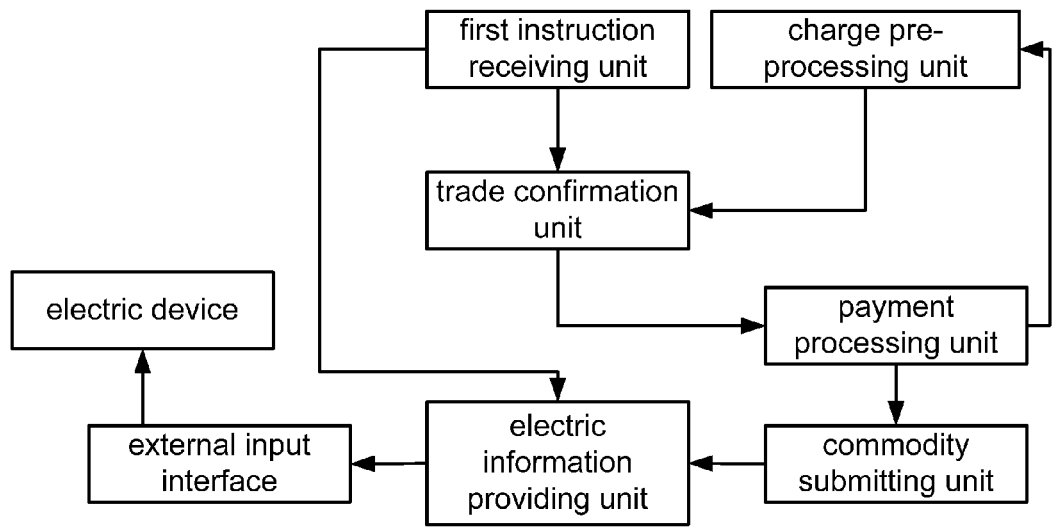
FIG. 9 shows a schematic diagram for illustrating an automatic sale terminal of the present disclosure.

Referring to FIG. 9, an automatic sale terminal (AST) of the present disclosure is provided to connect to the network server. Therefore, consumers may use the AST to login in the network server and order a commodity, which means the consumers may get their commodity without the need of waiting for non-local delivery. The AST includes a main circuit, and the main circuit includes an external input interface, a first instruction receiving unit, an electric information providing unit, a charge pre-processing unit, a payment processing unit, a commodity submitting unit, and a trade confirmation unit.

The external input interface is configured for connecting to an electric information input device of the requester. The external input interface may be a cable interface or a wireless interface. For example, the external input interface may be a USB interface, a Bluetooth interface, a Wi-Fi interface or an IR interface.

The first instruction receiving unit is configured for receiving a trade instruction from the electric information input device. The trade instruction may be a purchase instruction, free software installation, licensing software installation, free data input, or charging data input, and so on.

The electric information providing unit is configured for fetching electric information from a local storage, an external inputting device, a network download or on-the-spot record according to the trade instruction received by the first instruction receiving unit.

The charge pre-processing unit is configured for receiving cashes or verifying electric payment from the requester. The charge pre-processing unit may accept coins, bank cards, shopping cards or mobile phone payment.

The payment processing unit is configured for charging corresponding money from cashes or electric payments.

The commodity submitting unit is configured for sending the electric information to the electric devices via the external input interface after the payment is successful.

The trade confirmation unit is configured for matching the payment information received by the charge pre-processing unit and the trade information received by the first instruction receiving unit. A trade state of the commodity is confirmed if a match result is positive. Alternatively, the electric payment may be an electric code or an identity card number.

Therefore, the AST may be arranged in airports, train stations, public squares, or other public places for the consumers. When the consumer uses the AST for online shopping, every unit functions as is described above.

Figure 10:
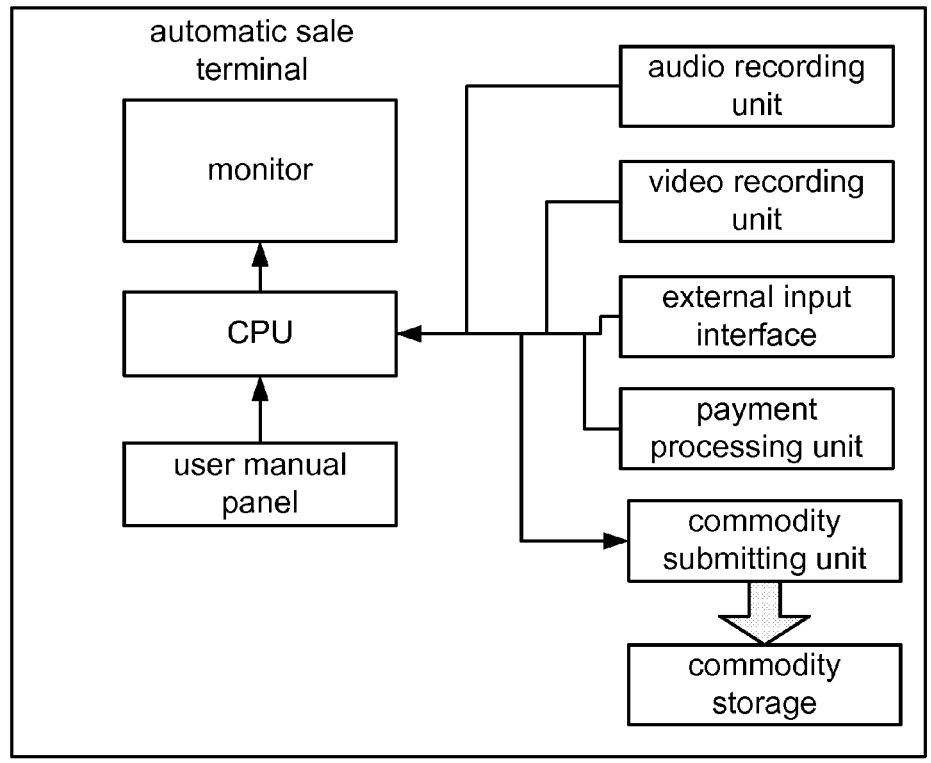
FIG. 10 shows a schematic diagram for alternatively illustrating an automatic sale terminal of the present disclosure.

Referring to FIG. 10, the AST may further include a user manual panel. A plurality of information processing units may be integrated into one or more universal CPUs (central processing units).

Alternatively, the AST may further include a video recording unit connecting to the CPU, an identification verifying unit configured for verifying a consumer with face identification, fingerprint identification, or pupil of the eye identification, therefore verifying the electric payment. Therefore, there is no need of inputting account and password for the user.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A network data exchange method, comprising the steps of:
   a network server receiving a commodity browsing request containing a requester network address from a network;
   a network server finding out a camera corresponding to the commodity browsing request according to a correspondence between the commodity browsing request and the camera;
   checking whether the camera is available or not;
   responsive to a YES check result of the camera being available, obtaining a control right or an access right of the camera;
   responsive to a NO check result of the camera not being available, sending the commodity browsing request to a waiting queue, and obtaining a video library containing videos of a commodity and sending thereof to the requester network address by the network;
   the network sever obtaining the control right or access right of the camera;
   using the camera to capture the commodity according to a received camera operating request and obtaining videos or images of the commodity; and
   sending the videos or the images to the requester network address by the network.

2. The network data exchange method of claim 1, wherein the procedure of obtaining a video library comprises:
   listing videos sorted by commodity name, view angle, view distance, view light beams or view mode from the video library on a webpage according to the commodity browsing request; and choosing the videos filtered by commodity name, view angle, view distance, view light beams or view mode from the video library according to the commodity browsing request.

3. The network data exchange method of claim 2, further comprising the following procedure after the procedure of sending the image or the video to the requester network address by the network:
finding out the camera corresponding to the commodity browsing request when the commodity browsing request contains demands of changing view angle, photo-sensibility, ambient light, zooming in, zooming out, or camera switching.

4. The network data exchange method of claim 1, wherein the procedure of finding out the camera corresponding to the commodity browsing request comprises:
finding out the camera for automatically capturing the commodity under predetermined rules according to the correspondence between the commodity browsing request and the camera; or
finding out the camera for capturing the commodity with various view positions, view distances or view angles regardless of the predetermined rules according to the correspondence between the commodity browsing request and the camera; and
in the step of obtaining a control right or an access right of the camera, the control right or the access right of the camera is individually obtained or shared with another or other requesters.

5. The network data exchange method of claim 1, wherein the procedure of finding out the camera corresponding to the commodity browsing request comprises:
finding out the camera assigned to the requester according to request information of the commodity browsing request; or
finding out the camera corresponding to the commodity browsing request according to the correspondence between the commodity browsing request and the camera from local, remote market or network camera database.

6. The network data exchange method of claim 1, wherein the procedure of finding out the camera corresponding to the commodity browsing request comprises:
finding out the camera for capturing a standard commodity or a customized commodity corresponding to the commodity browsing request; and
after the procedure of sending the videos or the images to the requester network address by the network, the following procedures are comprised:
receiving a commodity ordering request for a standard commodity, a customized commodity, a desired style or a specific commodity from the network;
judging the type of the commodity ordering request, and:
if the commodity ordering request is for a standard commodity, generating an order containing requester information and standard commodity information and sending the order to a manufacturing place for on-the-spot manufacture;
if the commodity ordering request is for a customized commodity, generating an order containing requester information and customized commodity information and sending the order to a manufacturing place for on-the-spot manufacture;
if the commodity order request is for a desired style commodity, generating an order containing requester information and desired style commodity information and sending the order to a manufacturing place for on-the-spot manufacture;
if the commodity order request is for a specific commodity, generating an order containing requester information and specific commodity information and sending the order to a manufacturing place for on-the-spot manufacture.

7. The network data exchange method of claim 6, wherein the method further comprises the steps of:
sending a commodity complete notification containing a commodity preview network link to the requester via email, SMS (short message service) or instant message service;
receiving a commodity preview request from the requester by the network;
sending commodity videos taken by the camera to the requester by the network; and
delivering the commodity to the requester after acceptance check received from the requester by the network.

8. The network data exchange method of claim 1, wherein the procedure of sending the videos or the images to the requester network address by the network comprises:
checking whether a 3D (3-Dimensional) browsing demand is included in the commodity browsing request; and
if a checking result is positive, sending a 3D data of the commodity to the requester network address;
if a checking result is negative, sending a 2D data of the commodity to the requester network address.

9. A network server comprising:
a request receiving unit configured for receiving a commodity browsing request containing a requester network address;
a resource searching unit configured for finding out a camera corresponding to the commodity browsing request;
a judging unit configured for checking availability of the camera and triggering the resource obtaining unit if the camera is available;
a request caching unit configured for caching the commodity browsing request and sending the commodity browsing request to a waiting queue if there is no available camera; and
a video saving unit configured for saving videos of a commodity to a video library, wherein the resource obtaining unit obtains the saved videos from the video library if there is no available camera and sends the saved videos to the requester network address;
a resource obtaining unit configured for obtaining a control right or an access right of the camera;
a data obtaining unit configured for capturing the commodity according to a camera operating request; and
a data sending unit configured for sending the images or the videos to the requester network address after the images or the views are taken by the data obtaining unit.

10. The network server of claim 9, wherein the videos saving unit saves the videos of the commodity according to commodity name, view angle, view distance, light beams or view mode, and the network server further comprises a video listing unit configured for choosing the videos according to commodity name, view angle, view distance, light beams or view mode of from the video saving unit according to the commodity browsing request, and listing the videos on the webpage with a tree structure.

11. The network server of claim 10, further comprising a camera operating unit configured for operating the camera according to the commodity browsing request containing demands of changing view angle, photo-sensibility, zooming out, zooming in, or switching camera.

12. The network server of claim 9, further comprising a resource sharing unit configured for sending a camera sharing instruction to the data sending unit and instructing the data sending unit to send the videos or the images to more than one requesters.

13. The network server of claim 9, further the request receiving unit is configured for receiving commodity order request; and the network server further comprising a commodity listing unit and a commodity complete notifying unit, wherein:

the commodity listing unit is configured for listing complete commodity or commodity component, and according to the commodity order request received by the request receiving unit;

if the commodity ordering request is for a standard commodity, generating an order containing requester information and standard commodity information and sending the order to a manufacturing place;

if the commodity ordering request is for a customized commodity, generating an order containing requester information and customized commodity information and sending the order to a manufacturing place for on-the-spot manufacture;

if the commodity order request is for a specific commodity, generating an order containing requester information and specific commodity information and sending the order to a manufacturing place; and the commodity complete notification unit is configured for sending a commodity complete notification to the requester via email, SMS or instant message service when the commodity manufacture is complete.

14. The network server of claim 9, wherein the camera is a 3D (3-Dimensional) camera.

* * * * *